United States Patent
Grossman (10) Patent No.: US 12,045,937 B2
(45) Date of Patent: Jul. 23, 2024

(54) GRAPHICS PROCESSING SYSTEMS AND METHODS WITH GEOMETRY LEVEL OF DETAIL PROCESSING

(71) Applicant: Microsoft Technology Licensing, LLC, Redmond, WA (US)

(72) Inventor: Mark S. Grossman, Palo Alto, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 107 days.

(21) Appl. No.: 17/828,914

(22) Filed: May 31, 2022

(65) Prior Publication Data

US 2023/0386133 A1 Nov. 30, 2023

(51) Int. Cl.
*G06T 17/20* (2006.01)

(52) U.S. Cl.
CPC .......... *G06T 17/20* (2013.01); *G06T 2210/12* (2013.01); *G06T 2210/36* (2013.01)

(58) Field of Classification Search
None
See application file for complete search history.

(56) References Cited

U.S. PATENT DOCUMENTS

| 9,013,498 | B1* | 4/2015 | Montrym | G06T 15/005 345/582 |
| 10,388,058 | B2 | 8/2019 | Goossen et al. | |
| 10,991,146 | B2 | 4/2021 | Kazakov et al. | |
| 2005/0104898 | A1* | 5/2005 | Moffitt | G06T 15/20 345/622 |
| 2009/0195541 | A1* | 8/2009 | Peng | G06T 15/005 345/420 |
| 2010/0266216 | A1* | 10/2010 | Choe | G06T 17/20 382/233 |
| 2012/0038657 | A1* | 2/2012 | Grossman | G06T 15/04 345/585 |
| 2018/0012400 | A1 | 1/2018 | Evans | |
| 2019/0236829 | A1 | 8/2019 | Hakura et al. | |

(Continued)

OTHER PUBLICATIONS

"DirectX-Graphics-Samples", Retrieved From: https://github.com/microsoft/directx-graphics-samples/blob/master/Samples/Desktop/D3D12MeshShaders/src/DynamicLOD/readme.md, Jul. 16, 2020, 4 Pages.

(Continued)

*Primary Examiner* — Sultana M Zalalee
(74) *Attorney, Agent, or Firm* — Ranjeev Singh; Singh Law, PLLC (57) ABSTRACT

Graphics processing systems and methods with geometry level of detail processing are described. An example graphics processing system includes a processor configured to retrieve a first level of detail value for a meshlet instance. The processor may further be configured to compute a second level of detail value for a meshlet instance. The processor may further be configured to, based on a comparison between the first level of detail value for the meshlet instance and the second level of detail value for the meshlet instance, select a final level of detail value for the meshlet instance. The processor may further be configured to fetch vertices and corresponding indices for the meshlet instance based on the final level of detail value for the meshlet instance and process the vertices of the meshlet instance.

18 Claims, 7 Drawing Sheets

(56) References Cited

U.S. PATENT DOCUMENTS

2022/0058872 A1  2/2022  Schmalstieg et al.
2023/0101978 A1* 3/2023  Neff ........................ G06T 17/10
                                                          345/418

OTHER PUBLICATIONS

Grossman, et al., "The Xbox Series X System Architecture", IEEE Micro, IEEE Service Center, vol. 41, Issue 2, Feb. 15, 2021, pp. 22-28.

Lambert, et al., "A View-Dependent Metric for Patch-Based LOD Generation & Selection", In Proceedings of the ACM on Computer Graphics and Interactive Techniques, vol. 1, Issue 1, Jul. 25, 2018, pp. 1-21.

"International Search Report and Written Opinion Issued in PCT Application No. PCT/US2023/018420", Mailed Date: Jul. 11, 2023, 12 Pages.

\* cited by examiner

```
┌─────────────────────────────────────────────────────────────────────┐
│  FOR EACH MESHLET INSTANCE ASSOCIATED WITH THE FRAME, A PROCESSOR   │
│  PERFORMING TRANSFORMATION AND BOUNDING BOX PROCESSING OPERATIONS   │
│  TO DETERMINE IF A MESHLET INSTANCE IS VISIBLE ON A PROJECTED SCREEN│
└─────────────────────────────────────────────────────────────────────┘
                                    │  710
                                    ▼
┌─────────────────────────────────────────────────────────────────────┐
│  FOR EACH VISIBLE MESHLET INSTANCE ASSOCIATED WITH THE FRAME,       │
│  RETRIEVING A FIRST LEVEL OF DETAIL VALUE                           │
└─────────────────────────────────────────────────────────────────────┘
                                    │  720
                                    ▼
┌─────────────────────────────────────────────────────────────────────┐
│  FOR EACH VISIBLE MESHLET INSTANCE ASSOCIATED WITH THE FRAME,       │
│  COMPUTING A SECOND LEVEL OF DETAIL VALUE                           │
└─────────────────────────────────────────────────────────────────────┘
                                    │  730
                                    ▼
┌─────────────────────────────────────────────────────────────────────┐
│  FOR EACH VISIBLE MESHLET INSTANCE ASSOCIATED WITH THE FRAME, BASED │
│  ON A COMPARISON BETWEEN THE FIRST LEVEL OF DETAIL VALUE FOR THE    │
│  VISIBLE MESHLET INSTANCE AND THE SECOND LEVEL OF DETAIL VALUE FOR  │
│  THE VISIBLE MESHLET INSTANCE, SELECTING A FINAL LEVEL OF DETAIL    │
│  VALUE FOR THE VISIBLE MESHLET INSTANCE                             │
└─────────────────────────────────────────────────────────────────────┘
                                    │  740
                                    ▼
┌─────────────────────────────────────────────────────────────────────┐
│  FETCHING VERTICES AND CORRESPONDING INDICES FOR EACH VISIBLE       │
│  MESHLET INSTANCE BASED ON A FINAL LEVEL OF DETAIL VALUE FOR EACH   │
│  VISIBLE MESHLET INSTANCE ASSOCIATED WITH THE FRAME AND PROCESSING  │
│  RESPECTIVE VERTICES                                                │
└─────────────────────────────────────────────────────────────────────┘
                                       750
                               700

FIG. 7
```

GRAPHICS PROCESSING SYSTEMS AND METHODS WITH GEOMETRY LEVEL OF DETAIL PROCESSING

BACKGROUND

Increasingly video games and other such applications are using detailed and fine geometry formed by meshes of triangles that may be segmented into "meshlets." Currently the process of managing the level of detail chosen for each meshlet is performed on the central processing unit (CPU). In addition, in traditional systems, this process must be completed before the geometry can be submitted for each frame to a graphics processing unit (GPU). Furthermore, the triangle data increasingly consumes a growing share of the memory associated with the CPU and the GPU. This growth in the share of the memory by the triangle data has resulted in systems with significantly large memory requirements. Moreover, the bandwidth required to fetch the large amount of triangle data has also proportionally gotten bigger.

Accordingly, there is a need for systems and methods for better handling of the data associated with the meshlets.

SUMMARY

In one example, the present disclosure relates to a graphics processing system comprising a processor configured to retrieve a first level of detail value for a meshlet instance. The processor may further be configured to compute a second level of detail value for the meshlet instance. The processor may further be configured to, based on a comparison between the first level of detail value for the meshlet instance and the second level of detail value for the meshlet instance, select a final level of detail value for the meshlet instance. The processor may further be configured to fetch vertices and corresponding indices for the meshlet instance based on the final level of detail value for the meshlet instance and process the vertices of the meshlet instance.

In another example, the present disclosure relates to a method for processing geometry for a frame. The method may include for each meshlet instance associated with the frame, a processor performing transformation and bounding box processing operations to determine if a meshlet instance is visible on a projected screen. The method may further include for each visible meshlet instance associated with the frame, retrieving a first level of detail value. The method may further include for each visible meshlet instance associated with the frame, computing a second level of detail value.

The method may further include for each visible meshlet instance associated with the frame, based on a comparison between the first level of detail value for the visible meshlet instance and the second level of detail value for the visible meshlet instance, selecting a final level of detail value for the visible meshlet instance. The method may further include fetching vertices and corresponding indices for each visible meshlet instance based on a final level of detail value for each visible meshlet instance associated with the frame and processing respective vertices.

In another example, the present disclosure relates to a graphics processing system comprising a processor configured to for each meshlet instance associated with a frame, perform transformation and bounding box processing operations to determine if a meshlet instance is visible on a projected screen. The processor may further be configured to, for each visible meshlet instance associated with the frame, retrieve a first level of detail value. The processor may further be configured to, for each visible meshlet instance associated with the frame, compute a second level of detail value.

The processor may further be configured to, for each visible meshlet instance associated with the frame, based on a comparison between the first level of detail value for the visible meshlet instance and the second level of detail value for the visible meshlet instance, select a final level of detail value for the visible meshlet instance. The processor may further be configured to fetch vertices and corresponding indices for each visible meshlet instance based on a final level of detail value for each visible meshlet instance associated with the frame and process respective vertices based on the final level of detail value for each visible meshlet instance associated with the frame.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

DETAILED DESCRIPTION

Examples described in this disclosure relate to a graphics processing systems and methods with geometry level of detail processing. As noted earlier, currently the process of managing the level of detail chosen for each meshlet is performed on the central processing unit (CPU). In addition, in traditional systems, this process must be completed before the geometry can be submitted for each frame to a graphics processing unit (GPU). Furthermore, the triangle data increasingly consumes a growing share of the memory associated with the CPU and the GPU. This growth in the share of the memory by the triangle data has resulted in systems with significantly large memory requirements. Moreover, the bandwidth required to fetch the large amount of triangle data has also proportionally gotten bigger. In contrast with such systems, the systems and methods described herein help minimize the space required for geometry primitives. As an example, instead of fetching all of the high-level of detail needed for a frame and then potentially discarding some of it, only the data corresponding to the right level of detail is fetched by the GPU. Furthermore, if for any reason the CPU is unable to provide the finest level of detail needed by the GPU, the GPU is able to use a coarser resident level of detail during the frame while it requests the needed finer level of detail. This results in saving of both space and the bandwidth required for fetching the meshlet data. Moreover, the time required to draw the meshlet is also reduced.

In certain examples described herein, such improvements are realized by using a residency map and a recording map to select only a subset of the triangle data for fetching and processing by the GPU, as described later. Initially, the residency map may be created by the CPU with one entry in the residency map per meshlet. Each entry in the residency map may point to at least one location (e.g., via a pointer or via an index) of a level of detail for each existing meshlet in a geometry pool created by the CPU. Alternatively, the geometry pool and the corresponding residency map may initially hold only entries for the coarsest levels of detail of each meshlet—i.e., those with the fewest triangles. The recording map may be configured to store integer values representative of levels of detail for meshlets as determined by the GPU. The recording map may be maintained and created by the GPU to keep a record of the processing of the various meshlets. After the completion of the processing of a frame, the recording map for that frame may be transferred to the host memory associated with the CPU. Both residency maps and recording maps may be indexed by an object ID and a meshlet ID for any meshlets within the object. An object may be viewed as an aggregation of meshlets. If an object is not broken into meshlets, then the maps may be indexed by the object ID only.

In summary, consistent with the present disclosure, a software-allocated and managed pool of resident geometry primitive data (vertices, indices, and attributes) that contains the best level of detail (LOD) values for current and next frames to be rendered is created by the CPU. In one example, a process on the host CPU is used to evict unneeded meshlet LODs (e.g., meshlet LODs with too high a level of detail) and bring in needed meshlet LODs from a backing store. A hardware LOD residency map with an entry per meshlet is loaded into the GPU. In one example, the GPU maintains a recording of the finest LOD needed for the frame it is rendering based primarily on the distance of the camera from the meshlet. The recording map maintained by the GPU is cleared to a value representing "empty," for example to the highest possible LOD value, before every frame. The residency map clamps the needed-LOD to the value of the resident LOD (i.e., the level needed may not have been brought into the memory pool). Then the resulting clamped LOD value is used to perform the geometry processing in the GPU, including the following operations: (1) fetching the selected meshlet indices, (2) fetching the vertex position values and attributes, (3) assembling the primitives (triangles or higher order surfaces), (4) tessellating the higher-order surfaces, if necessary, (5) shading the vertices, (6) rasterizing the triangles, and then (7) shading the resulting fragments. After the geometry is processed, the LOD recording map is read back to the host (or only portions of the map that were actually used are read). The host (e.g., the CPU) uses this to guide the eviction/fill of the managed geometry pool.

Figure 1:
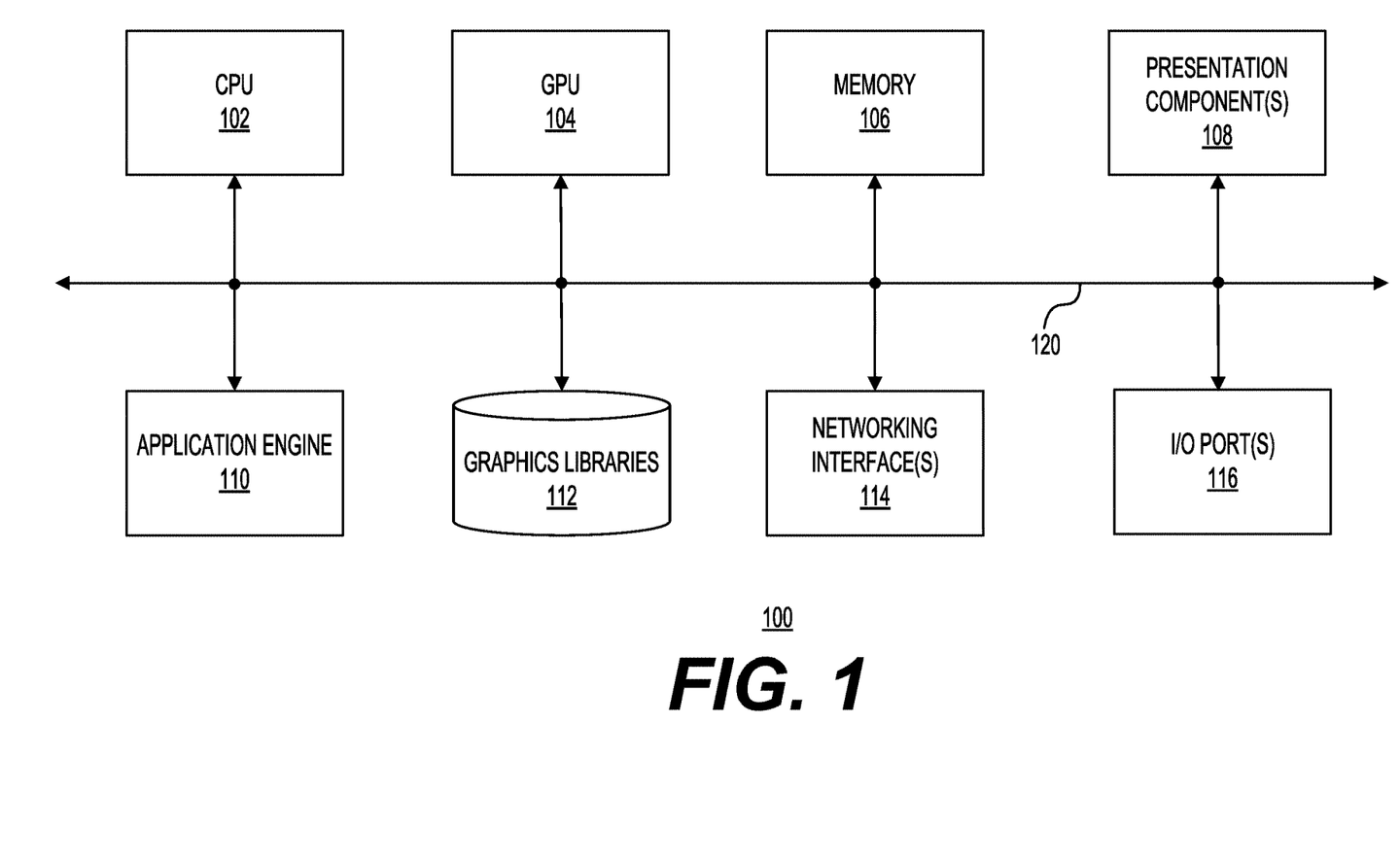
FIG. 1 shows a diagram of a system environment including a central processing unit (CPU) and a graphics processing unit (GPU) with geometry level of detail processing in accordance with one example.

FIG. 1 shows a diagram of a system environment 100 including a central processing unit (CPU) 102 and a graphics processing unit (GPU) 104 with geometry level of detail processing in accordance with one example. System environment 100 may further include memory 106, presentation component(s) 108, application engine 110, graphics libraries 112, networking interfaces 114, and I/O port(s) 116, which may be interconnected via one or more busses (e.g., bus 120) to each other and to CPU 102 and GPU 104. CPU 102 may execute instructions stored in memory 106. Memory 106 may be any combination of non-volatile storage or volatile storage (e.g., flash memory, DRAM, SRAM, or other types of memories). GPU 104 may read/write to memory 106 either directly or via a direct memory access (DMA) process. Presentation component(s) 108 may include displays, holographic devices, or other presentation devices. Displays may be any type of display, such as LCD, LED, or other types of display.

Still referring to FIG. 1, application engine 110 may include the graphics application and graphics libraries 112 may include the related libraries for use with application engine 110 and GPU 104. Network interface(s) 114 may include communication interfaces, such as Ethernet, cellular radio, Bluetooth radio, UWB radio, or other types of wireless or wired communication interfaces. I/O port(s) 116 may include Ethernet ports, Fiber-optic ports, wireless ports, or other communication or diagnostic ports. Although FIG. 1 shows system environment 100 as including a certain number of components arranged and coupled in a certain way, it may include fewer or additional components arranged and coupled differently. As an example, system environment 100 may include components such as sensors and user interface components. In addition, the functionality associated with system environment 100 may be distributed, as needed.

Figure 2:
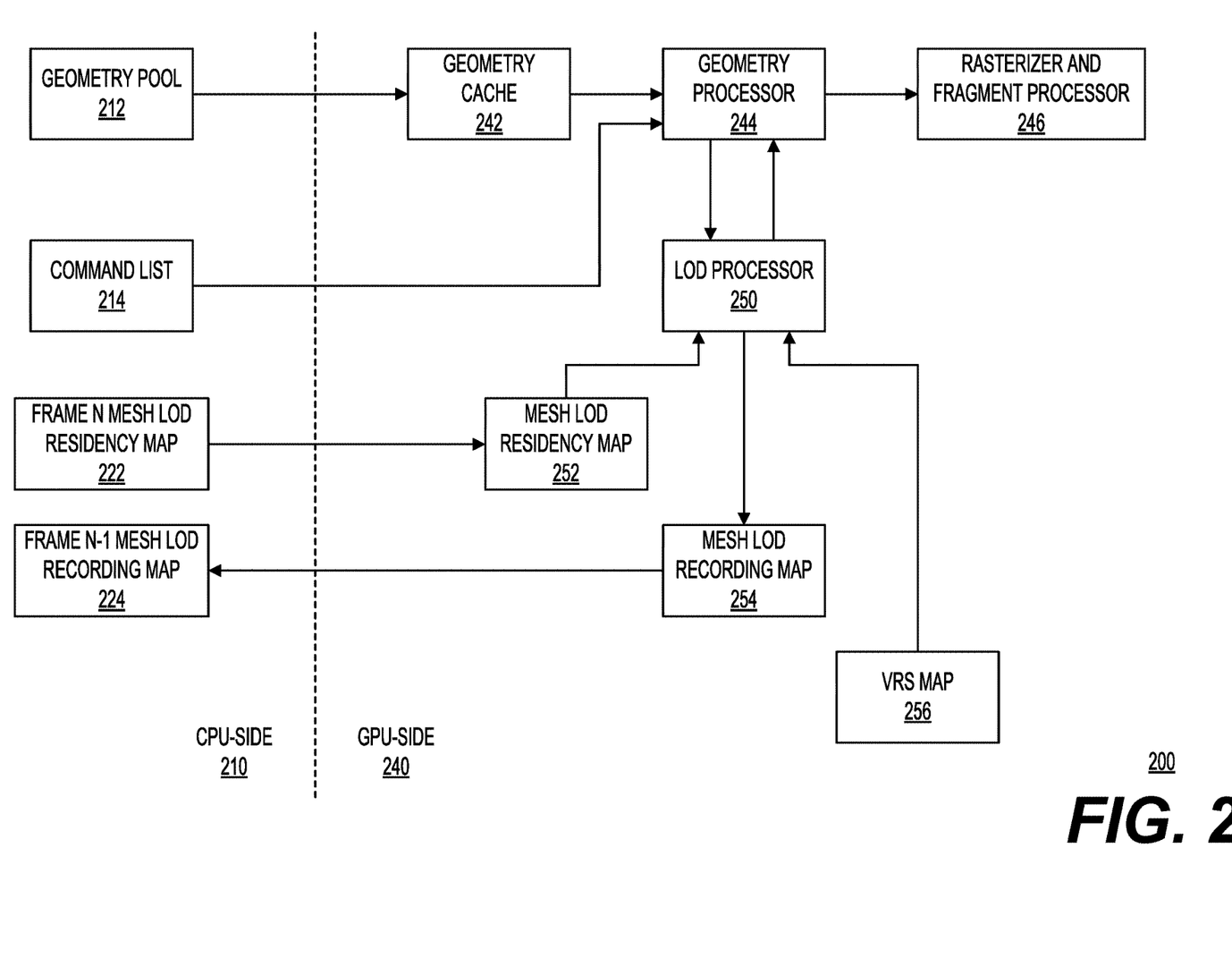
FIG. 2 shows a diagram of a graphics processing system with the data and the components on the CPU-side and the data and the components on the GPU-side with geometry level of detail processing in accordance with one example.

FIG. 2 shows a diagram of a graphics processing system 200 with the data and the components on the CPU-side 210 and the data and the components on the GPU-side 240 with geometry level of detail processing in accordance with one example. In this example, the CPU-side 210 of graphics processing system 200 may include geometry pool 212, command list 214, frame N mesh LOD residency map 222, and frame N-1 mesh LOD recording map 224. Geometry pool 212 may be a fixed-size pool of geometry data stored in the host memory (e.g., memory 106 of FIG. 1) associated with the CPU (e.g., CPU 102 of FIG. 1). Geometry pool 212 may include meshlets, where each meshlet is a data structure that may represent a certain number of vertices and primitives. As an example, geometry pool 212 may include meshlet vertices with varying level of detail (e.g., from the most detailed level to the least detailed level). Certain meshlet vertices may correspond to an intermediate level of detail. The number of triangles per meshlet may be a measure of the level of detail. In terms of the triangles per mesh, the level of detail may vary from 10,000 triangles per mesh, 2,500 triangles per mesh, 500 triangles per mesh, down to just a few triangles per mesh. The data structures for the triangles may be loaded from a bulk storage (not shown) into the host memory as part of the geometry pool 212. The loading itself may be selective—in that the CPU working with the application engine may load meshlets that are likely to be used for the scene using a coarse-level software rendering. Such coarse-level software rendering may include using bounding box tests and draws, similar to the ones used by the GPU.

Having created the geometry pool 212, the CPU (e.g., in response to directions from application engine 110 of FIG. 1) may also set up a command list 214 for processing on the GPU-side 240. Command list 212 may include a pair of commands for each meshlet or another unit of organization (e.g., an object). The object ID and the meshlet ID may be provided with each command for use by LOD processor 250. Each pair of commands may include a command that directs the GPU to perform a bounding box test and another command to draw the meshlet if the bounding box test is a success. The testing may also include occlusion testing using a depth buffer or other techniques.

The CPU-side 210 may further include a residency map for each frame (e.g., frame N mesh LOD residency map 222) in geometry pool 212 with at least one entry in the residency map per meshlet. Each entry in the residency map may contain an integer level of detail value for comparison with a calculated LOD value. Moreover, each entry in the residency may also point to at least one location (e.g., via a pointer or via an index) of a level of detail for the meshlet vertices in a geometry pool created by the CPU. The residency map may also point to multiple locations for different levels of detail for the vertices associated with a single meshlet, as well. The recording map may be configured to store integer values representative of levels of detail for meshlets as determined by the GPU. The recording map (e.g., frame N mesh (current frame) LOD recording map) may be maintained and created by the GPU to keep a record of the processing of the various meshlet vertices. After the completion of the processing of a frame, the recording map for that frame may be transferred to the host memory associated with the CPU. This then becomes the frame N-1 recording map 224.

Figure 3:
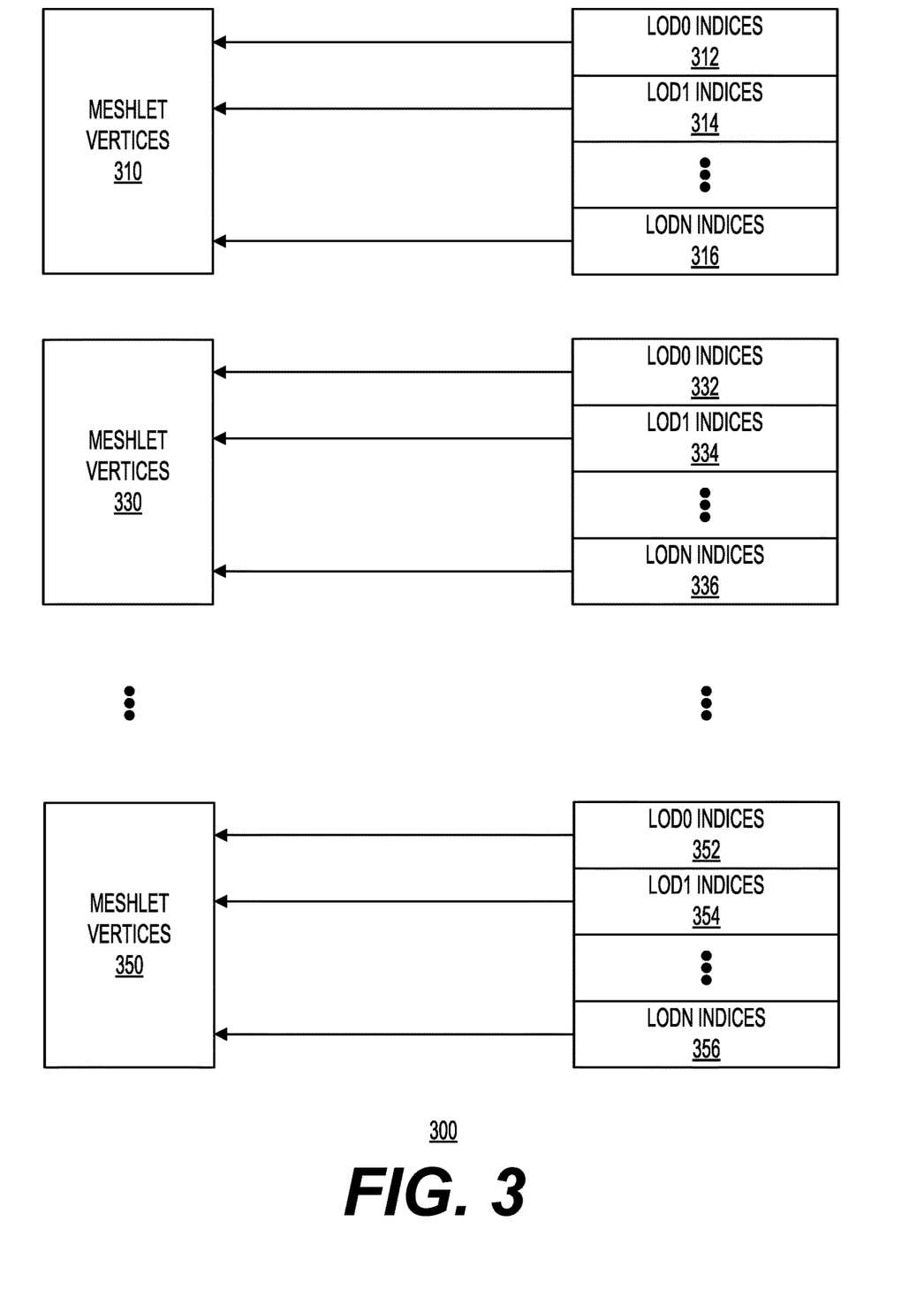
FIG. 3 shows a diagram of a geometry pool set up by the CPU for use by the GPU as part of geometry level of detail processing in accordance with one example.

With continued reference to FIG. 2, in this example, the GPU-side 240 of graphics processing system 200 may include geometry cache 242, geometry processor 244, rasterizer and fragment processor 246, LOD processor 250, mesh LOD residency map 252, mesh LOD recording map 254, and VRS map 256. During processing of a scene only portions of the scene that are relevant for the frames about to be drawn may be fetched by the GPU from geometry pool 212. As an example, the fetched geometry may be stored in a geometry cache 242. FIG. 3 shows on example of fetched geometry 300 for a frame. The fetched geometry in geometry cache 242 may include multiple meshlet vertices for different portions of the scene. In one example, geometry cache 242 may be implemented as a system level cache. In addition, geometry cache 242 may be used to store meshlet vertices for a scene having multiple instances of the same character (e.g., a spider) used in a frame, and thus allow those meshlet vertices to be reused with minimal latency.

As an example, as shown in FIG. 3, meshlet vertices may include meshlet vertices 310, meshlet vertices 330, and meshlet vertices 350. A given meshlet may have multiple LODs, and thus multiple sets of indices for the primitives. In the example shown in FIG. 3, meshlet vertices 310 may have the following indices: LOD0 indices 312, LOD1 indices 314, and LODN indices 316. Each of the indices may point to meshlet vertices with differing levels of detail. Thus, LOD0 indices 312 may point to vertices with the highest level of detail. LOD1 indices 314 may point to vertices with an intermediate level of detail and LODN indices 316 may point to vertices with the lowest level of detail. Meshlet vertices 330 may have the following indices: LOD0 indices 332, LOD1 indices 334, and LODN indices 336. Each of the indices may point to a list of primitives and the primitives may point to meshlet vertices with differing levels of detail. Thus, LOD0 indices 332 may point to vertices with the highest level of detail. LOD1 indices 334 may point to vertices with an intermediate level of detail and LODN indices 336 may point to vertices with the lowest level of detail. Meshlet vertices 350 may have the following indices: LOD0 indices 352, LOD1 indices 354, and LODN indices 356. Each of the indices may point to meshlet vertices with differing levels of detail. Thus, LOD0 indices 352 may point to vertices with the highest level of detail. LOD1 indices 354 may point to vertices with an intermediate level of detail and LODN indices 356 may point to vertices with the lowest level of detail. Since the LOD indices themselves do not take up a lot of storage (e.g., only a few bytes), a substantial number of LOD indices may be kept in the geometry pool, which may point to certain other pointers, which then may point to the meshlet vertices.

Referring back to FIG. 2, geometry processor 244 may process the fetched geometry, which may further be processed by rasterizer and fragment processor 246. The graphics processing pipeline including geometry processor 244 and rasterizer and fragment processor 246 may be implemented as part of the GPU that can execute multiple threads in parallel using stream processing. Other types of parallel processing may also be used to increase the performance of the graphics processing pipeline. Additional details concerning the interactions among LOD processor 250, mesh LOD residency map 252, mesh LOD recording map 254, and variable rate shading (VRS) map 256 are provided with respect to FIGS. 4 and 5. Although FIG. 2 shows a certain number of components of graphics processing system 200 arranged in a certain manner, there could be more or fewer components arranged differently. Moreover, the residency map may be implemented as either (1) a linked list where each list item contains a currently resident meshlet ID and its associated memory pointer, (2) a fixed-length array with valid memory pointer entries for all currently resident meshlet IDs, or (3) another implementation.

Figure 4:
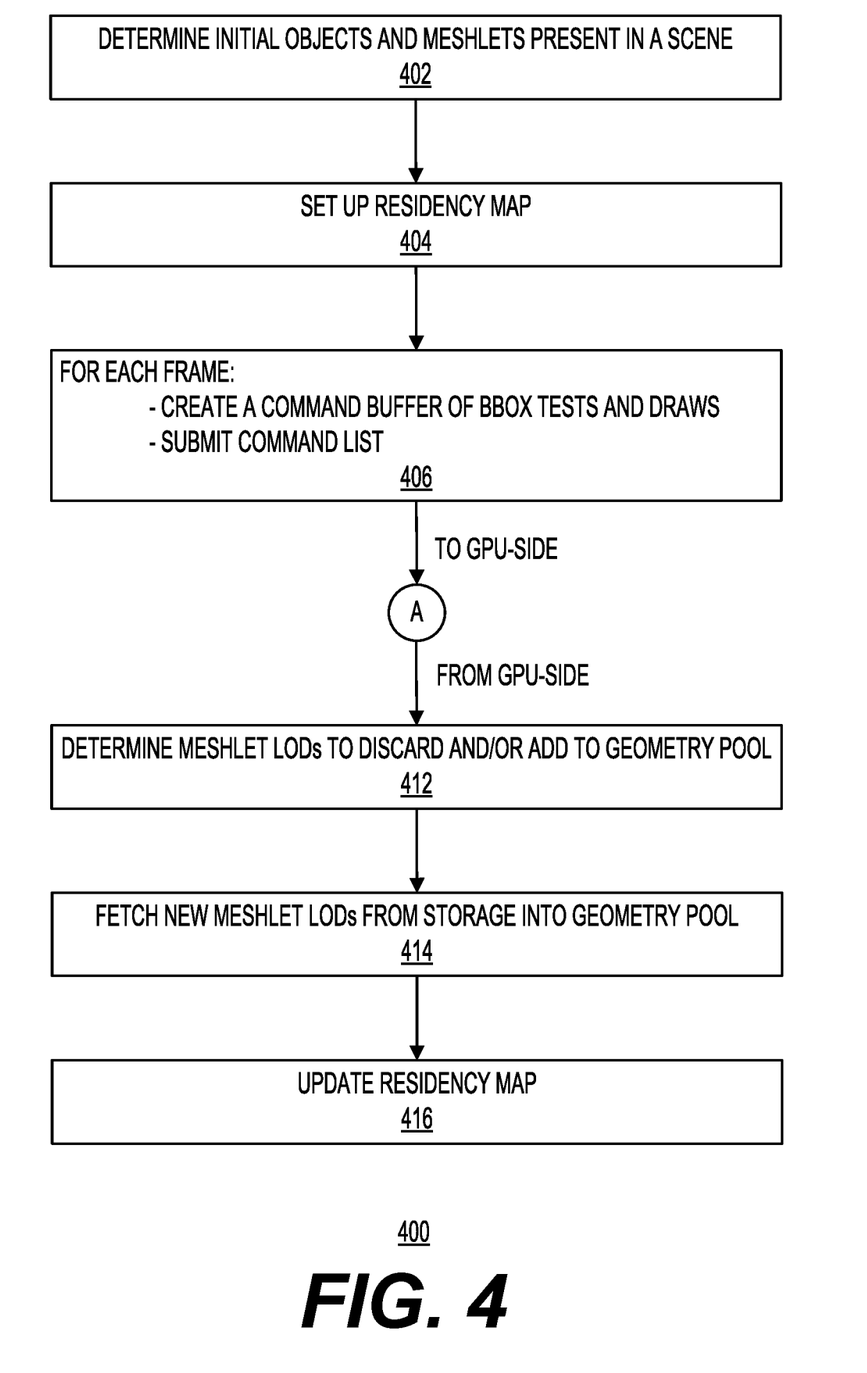
FIG. 4 shows a processing timeline for the tasks being performed on the CPU-side in accordance with one example.

FIG. 4 shows a processing timeline 400 for the tasks being performed on the CPU-side 210 of FIG. 2 in accordance with one example. Processing timeline 400 may include: (1) a first set of tasks (e.g., tasks 402, 404, and 406) after which the processing moves on to the GPU-side 240, and (2) a second set of tasks (e.g., tasks 412, 414, and 416) that are performed after the GPU-side 240 has completed the tasks described with respect to processing timeline 500 of FIG. 5. As part of task 402, the CPU may determine initial objects and meshlets present in a scene. As part of task 404, the CPU may set up a residency map.

With continued reference to FIG. 4, as part of task 406, CPU may perform two sub-tasks for each frame. The CPU may first create a command list of bbox tests and draws, and then submit the command list with the pairs of bbox tests and draws. Each pair of commands may include a command that directs the GPU to perform a bounding box test and another command to draw the meshlet if the bounding box test is a success. Once the CPU submits the command list, the processing moves to the GPU-side 240.

Figure 5:
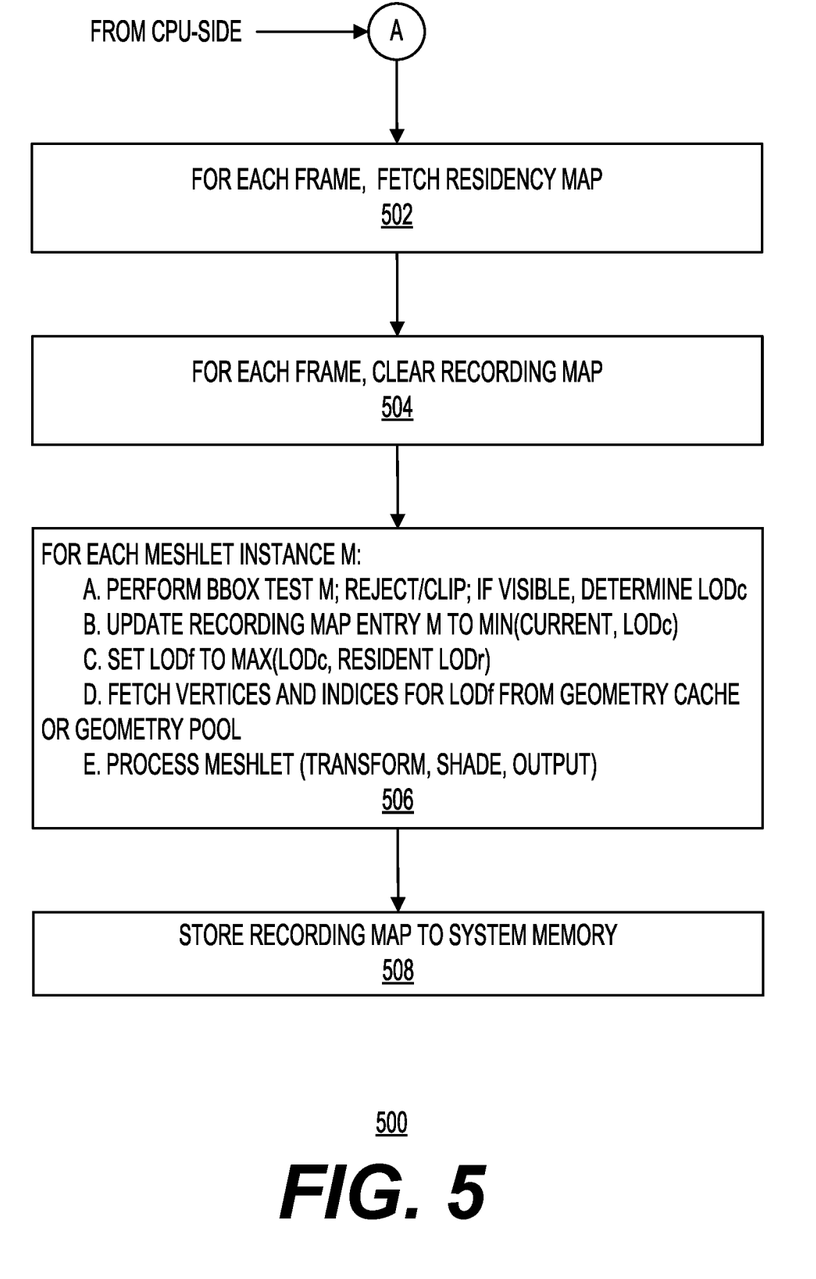
FIG. 5 shows a processing timeline for the tasks being performed on the GPU-side in accordance with one example.

FIG. 5 shows a processing timeline 500 for the tasks being performed on the GPU-side 240 of FIG. 2 in accordance with one example. Processing timeline 500 may be performed as a loop for a set of frames (e.g., N frames). As part of task 502, the geometry processor may fetch the residency map for each frame. As explained earlier, each entry in the residency map may point to at least one location (e.g., via a pointer or via an index) of a level of detail for the meshlet vertices in the geometry fetched into geometry cache 242 of FIG. 2 or stored in geometry pool 212 of FIG. 2. The residency map may also point to multiple locations for different levels of detail for the vertices associated with a single meshlet, as well. As part of task 504, the GPU may clear the recording map. As explained earlier, the recording map may be configured to store integer values representative of levels of detail for meshlets as determined by the GPU. The recording map may be maintained and created by the GPU to keep a record of the processing of the various meshlets.

With continued reference to FIG. 5, task 506 may include several sub-tasks that may be performed by the GPU for each meshlet instance (e.g., meshlet instance M) submitted by the CPU in the command buffer for the current frame. Sub-task A of task 506 may include the geometry processor (e.g., geometry processor 244 of FIG. 2) performing bounding box testing for the meshlet instance M. The bbox testing may include projecting the volume corresponding to the meshlet instance M onto a screen and performing depth testing, such as the hierarchical Z-test. As a result of this testing, meshlet instance M may be rejected if it is not visible despite clipping. If, however, the bbox testing results in the instance meshlet M being visible, then the LOD processor (e.g., LOD processor 250 of FIG. 2) may perform additional processing. Bbox tests can be both static and dynamic (e.g., if an object being tested is stretched or if the character being projected has moving parts). As an example, after the bbox testing, the LOD processor may project the meshlet instance M on the screen and determine how many pixels of the screen are covered by the meshlet instance M. Based on this determination, the LOD processor may indicate to the geometry processor the appropriate geometry with the right LOD values that should be further processed. This LOD is referred to as the computed LOD (LODc) in FIG. 5. As part of this process, the LOD processor may take into account various factors, including the distance of the projected scene from the observer (the closer the observer is to a scene the lower the LOD value) and relationship of the parts of the scene in terms of foveated LOD. In other words, the meshlets closer to the periphery of the frame (i.e., the non-foveal region) may have a coarser level of detail. Moreover, those meshlets that are out of focus from the observer's (e.g., the camera's) point of view may be selected to have a lower level of detail (corresponding to a higher LOD value). In addition, the LOD processor may also receive input from a variable rate shading map (e.g., VRS map 256 of FIG. 2). Since the VRS map allows for varying the shading rate for different regions of the frame, the VRS map input may also be used in selecting the right level of detail for a mesh or a meshlet. In sum, the LOD processor may determine the LOD value that corresponds to the detail that is visible, needed, and is important to the frame. Finally, the GPU instead of just using predetermined meshlet geometry, may rely upon tessellation to create higher-order surfaces (e.g., triangles) out of control points and functions. The bounding box (bbox) testing may allow varying the density of GPU-tessellated higher-order surface descriptions. As an example, an object in a scene that is close in front may consist of many more triangles (i.e., a finer LOD) than the same object far away or in a corner.

Still referring to FIG. 5, as part of sub-task B of task 506, the LOD processor (e.g., LOD processor 250 of FIG. 2) may update the recording entry for the meshlet instance M to the minimum value of the current LOD in the recording map (e.g., mesh LOD recording map 254 of FIG. 2) and the computed LOD (LODc). As part of this, the LOD processor may perform a read-modify-write to record the higher level of detail corresponding to the minimum value of the current LOD in the recording map and the computed LOD (LODc). In one example, the recording map may be set up as a searchable list that can be searched based on an identifier associated with a meshlet. The entries in the searchable list may be hashed such that a hash search could be made to first determine whether the recording map contains an entry corresponding to the meshlet. Next, as part of sub-task C of task 506, the LOD processor may set the final LOD (LODf corresponding to the LOD value that will be used to draw) as the maximum of the computed LOD (LODc) and the LOD value in the residency map (LODr). This way the final LOD corresponds to a coarser representation, which in turn is faster to draw. The LOD processor may then communicate the LODf value to the geometry processor for further processing.

With continued reference to FIG. 5, as part of sub-task D of task 506, the geometry processor may fetch vertices and indices for the meshlet with the final level of detail (LODf). Since geometry cache 242 is optional, the geometry processor (e.g., geometry processor 244 of FIG. 2) may fetch the vertices and the indices from the geometry cache or the geometry pool depending on the implementation. Next, as part of sub-task E of task 506, the meshlet may be processed further. As an example, the meshlet vertices and primitives may be processed by rasterizer fragment processor 246 of FIG. 2 in order to create fragments from the primitives. Each fragment may correspond to a pixel on the screen. The fragments may also be shaded to compute color. If the processing of a frame in terms of geometry processing, rasterizing, and shading takes too much time, then the GPU may apply a global bias to the LOD values, thus increasing the values. That, in turn, would result in coarser level of detail being processed, bringing down the time required to process the frame.

Finally, as part of task 508, the LOD processor may store the recording map for the frame (e.g., frame N-1) into the system memory. As an alternative, the system may be designed so that the CPU and GPU have shared access to the residency map and the recording map, obviating the need for copying; instead, the maps may be double buffered and exchanged via pointer swapping. As an example, mesh LOD recording map 254 may be stored into the CPU-side 210 system memory as frame N-1 mesh LOD recording map 224. Advantageously, the recording map for use with the CPU now contains LODs that are actually used even if they were not resident in the residency map previously, which in turn helps the CPU in determining the correct level of detail for the meshlets for frame N (the next frame) to bring into the geometry pool. This in turn helps reduce the amount of storage (e.g., DRAM) needed for storing the geometry pool, including geometric primitives (e.g., attributes and behaviors of objects, such as lines, rectangles, and cubes) and ray tracing acceleration structures. In addition, there are bandwidth savings in terms of the GPU not having to fetch geometry from the geometry pool that will not be required as part of processing the next frame. In sum, building the history of use of the geometry via the recording map and the residency map allows for substantial savings in terms of both memory capacity and memory bandwidth. Moreover, the LOD processor included in the GPU-side 240 helps off-load LOD processing from the CPU to the GPU. Although FIG. 5 shows the processing timeline 500 with a certain number of tasks and sub-tasks being performed in a certain order, the processing timeline 500 may include additional or fewer tasks and sub-tasks performed in a different order. As an example, the GPU may use the recording maps and the residency maps, along with the processing by the CPU, to control the level of detail of the primitives in the Bottom Level Acceleration Structure (BLAS) used for ray tracing. This would help optimize the amount of storage required for the BLAS primitives.

Referring back to FIG. 4, once the GPU-side 240 has completed the tasks described with respect to the processing timeline 500 of FIG. 5, the CPU-side 210 may perform additional tasks. As part of task 412, the CPU may determine meshlet LODs to discard and/or add to the geometry pool. As part of this process, the CPU may rely upon the historical usage data associated with the various LOD values as recorded via the recording map (e.g., frame N-1 mesh LOD recording map 224 of FIG. 2, and possibly saved copies from frame N-2, frame N-3, etc.). As part of task 414, the CPU may fetch new meshlet LODs from the storage into geometry pool. Next, as part of task 416, the CPU may update the residency map stored in the system memory (e.g., memory 106 of FIG. 1 or another suitable system memory) to reflect the resident level of detail values. The tasks described with respect to the processing timelines in FIGS. 4 and 5 may be performed with both immediate mode rendering GPUs and tile-based deferred rendering (TBDR) style GPUs. Although FIG. 4 shows the processing timeline 400 with a certain number of tasks and sub-tasks being performed in a certain order, the processing timeline 400 may include additional or fewer tasks and sub-tasks performed in a different order.

Figure 6:
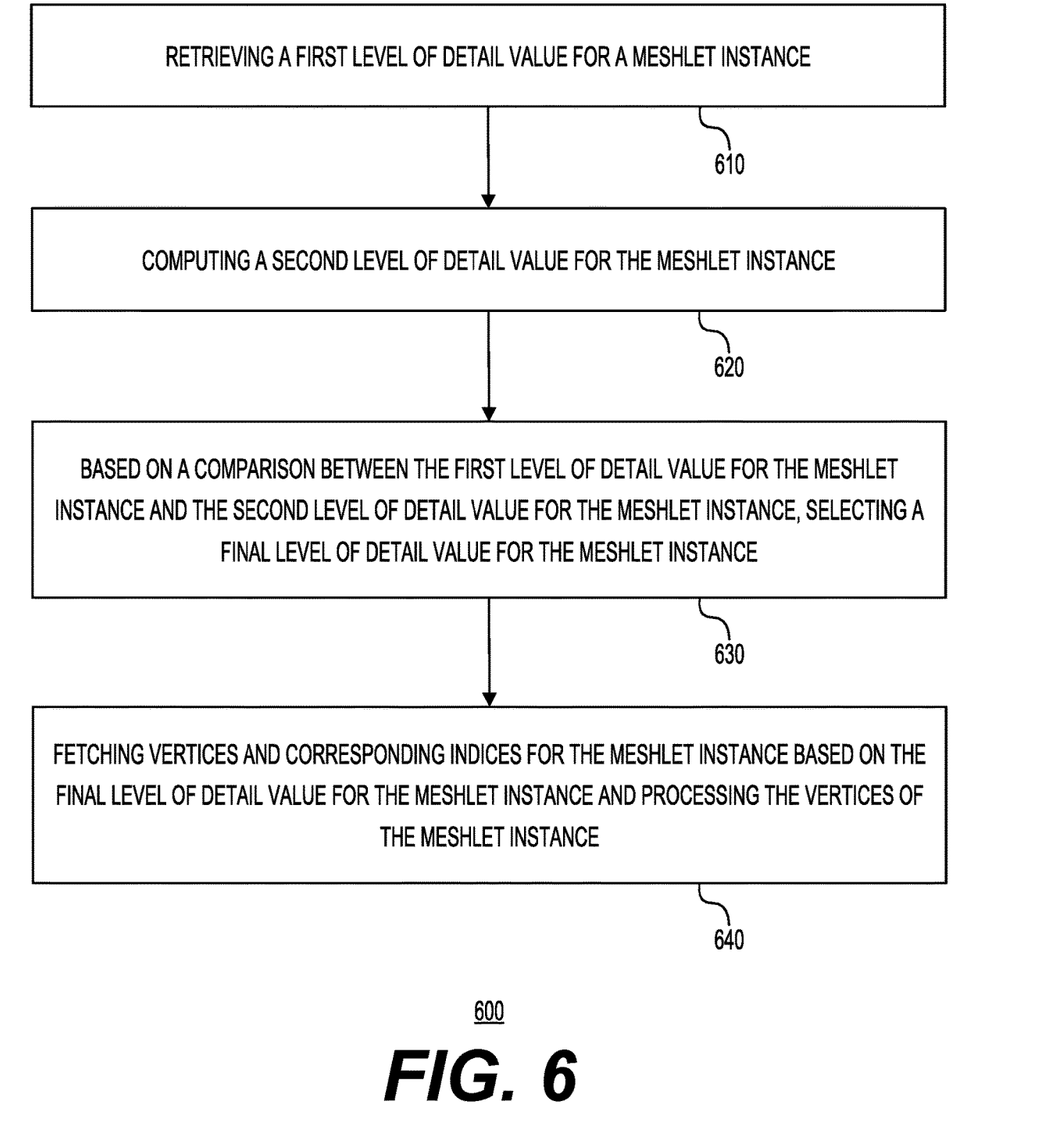
FIG. 6 shows a flow chart of a method for graphics processing in accordance with one example.

FIG. 6 shows a flow chart 600 of a method in accordance with one example. In one example, the steps described in this method may be performed by the graphics processing system 200 described earlier with respect to FIG. 2. Step 610 may include retrieving a first level of detail value for a meshlet instance. In one example, this step may include performing task 502 described earlier with respect to FIG. 5. As part of task 502, the geometry processor may fetch the residency map for the frame including the meshlet instance. As explained earlier, each entry in the residency map may point to at least one location (e.g., via a pointer or via an index) of a level of detail for the meshlet vertices in the geometry fetched into geometry cache 242 of FIG. 2 or stored in geometry pool 212 of FIG. 2. The residency map may also point to multiple locations for different levels of detail for the vertices associated with a single meshlet, as well.

Step 620 may include computing a second level of detail value for the meshlet instance. In one example, this step may include performing sub-task A of task 506 described earlier with respect to FIG. 5. As explained earlier, sub-task A of task 506 may include the geometry processor (e.g., geometry processor 244 of FIG. 2) performing a bounding box (bbox) test for the meshlet instance M. The bbox test may include projecting the volume corresponding to the meshlet instance M onto a screen and performing depth testing, such as the hierarchical Z-test. As a result of this testing, meshlet instance M may be rejected if it is not visible despite clipping. If, however, the bbox testing results in the instance meshlet M being visible, then the LOD processor (e.g., LOD processor 250 of FIG. 2) may perform additional processing. As an example, after the bbox testing, the LOD processor may project the meshlet instance M on the screen and determine how many pixels of the screen are covered by the meshlet instance M. Based on this determination, the LOD processor may indicate to the geometry processor the appropriate geometry with the right LOD values that should be further processed. This LOD is referred to as the computed LOD (LODc) in FIG. 5.

Step 630 may include based on a comparison between the first level of detail value for the meshlet instance and the second level of detail value for the meshlet instance, selecting a final level of detail value for the meshlet instance. In one example, step 630 may include performing sub-task C of task 506 of FIG. 5. As explained earlier, the LOD processor may set the final LOD (LODf) corresponding to the LOD value that will be used to draw as the maximum of the computed LOD (LODc) and the LOD value in the residency map (LODr). The LOD processor may then communicate the LODf value to the geometry processor for further processing.

Step 640 may include fetching vertices and corresponding indices based on the final level of detail value for the meshlet instance and processing the vertices. A single meshlet may include multiple triangles with three vertices per triangle, and any of the vertices may be shared with neighboring triangles. As such, neighboring triangles may use the same index value to point to a shared vertex. In this example, there may be 1:1 correspondence between unique vertices and indices. In one example, this step may include performing sub-tasks D and E of task 506 of FIG. 5. As described earlier, as part of sub-task D of task 506, the geometry processor may fetch vertices and indices for the meshlet with the final level of detail (LODf). Since geometry cache 242 is optional, the geometry processor (e.g., geometry processor 244 of FIG. 2) may fetch the vertices and the indices from the geometry cache or the geometry pool depending on the implementation. Next, as part of sub-task E of task 506, the meshlet may be processed further. As an example, the meshlet vertices and primitives may be processed by rasterizer fragment processor 246 of FIG. 2 in order to create fragments from the primitives. Each fragment may correspond to a pixel on the screen. The fragments may also be shaded to compute color. Although FIG. 6 describes the steps in a certain order, they need not be performed in this order.

Figure 7:
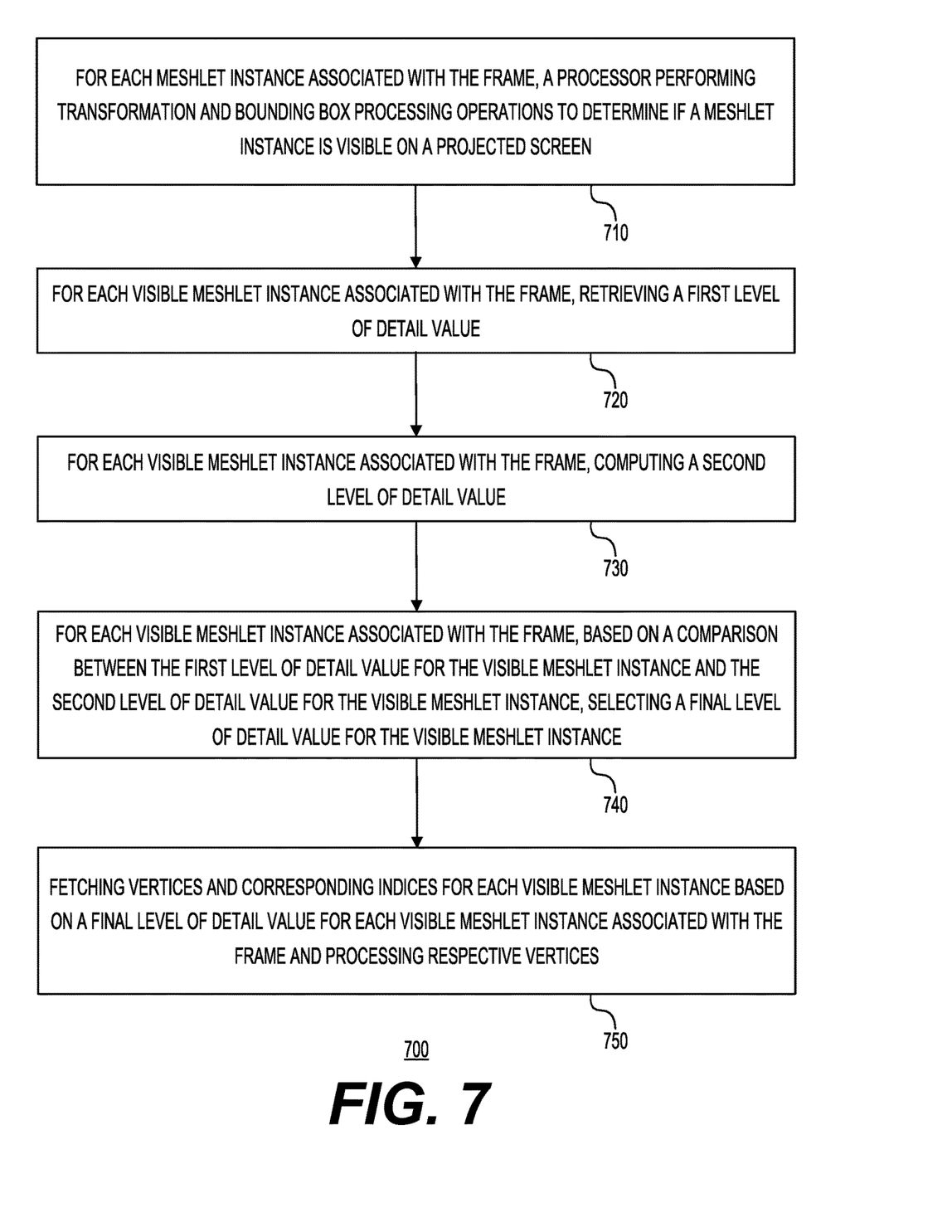
FIG. 7 shows another flow chart of a method for graphics processing in accordance with one example.

FIG. 7 shows a flow chart 700 of a method in accordance with one example. In one example, the steps described in this method may be performed by the graphics processing system 200 described earlier with respect to FIG. 2. Step 710 may include for each meshlet instance associated with the frame, a processor performing transformation and bounding box processing operations to determine if a meshlet instance is visible on a projected screen. In one example, this step may include performing sub-task A of task 506 of FIG. 5. As explained earlier, the first two parts of sub-task A of task 506 may include the geometry processor (e.g., geometry processor 244 of FIG. 2) performing a bounding box (bbox) test for the meshlet instance M. The bbox test may include projecting the volume corresponding to the meshlet instance M onto a screen and performing depth testing, such as the hierarchical Z-test. As a result of this testing, meshlet instance M may be rejected if it is not visible despite clipping.

Step 720 may include for each visible meshlet instance associated with the frame, retrieving a first level of detail value. In one example, this step may include performing task 502 described earlier with respect to FIG. 5. As part of task 502, the geometry processor may fetch the residency map for the frame including the meshlet instance. As explained earlier, each entry in the residency map may point to at least one location (e.g., via a pointer or via an index) of a level of detail for the meshlet vertices in the geometry fetched into geometry cache 242 of FIG. 2 or stored in geometry pool 212 of FIG. 2. The residency map may also point to multiple locations for different levels of detail for the vertices associated with a single meshlet, as well.

Step 730 may include for each visible meshlet instance associated with the frame, computing a second level of detail value. In one example, this step may include performing the last part of sub-task A of task 506 described earlier with respect to FIG. 5. As an example, after the bbox testing, the LOD processor may project the meshlet instance M on the screen and determine how many pixels of the screen are covered by the meshlet instance M. Based on this determination, the LOD processor may indicate to the geometry processor the appropriate geometry with the right LOD values that should be further processed. This LOD is referred to as the computed LOD (LODc) in FIG. 5.

Step 740 may include for each visible meshlet instance associated with the frame, based on a comparison between the first level of detail value for the visible meshlet instance and the second level of detail value for the visible meshlet instance, selecting a final level of detail value for the visible meshlet instance. In one example, step 740 may include performing sub-task C of task 506 of FIG. 5. As explained earlier, the LOD processor may set the final LOD (LODf corresponding to the LOD value that will be used to draw) as the maximum of the computed LOD (LODc) and the LOD value in the residency map (LODr). The LOD processor may then communicate the LODf value to the geometry processor for further processing.

Step 750 may include fetching vertices and corresponding indices based on a final level of detail value for each visible meshlet instance associated with the frame and processing respective vertices. As noted earlier, a single meshlet may include multiple triangles with three vertices per triangle, and any of the vertices may be shared with neighboring triangles. As such, neighboring triangles may use the same index value to point to a shared vertex. In this example, there may be 1:1 correspondence between unique vertices and indices. In one example, this step may include performing sub-tasks D and E of task 506 of FIG. 6. As described earlier, as part of sub-task D of task 506, the geometry processor may fetch vertices and indices for the meshlet with the final level of detail (LODf). Since geometry cache 242 is optional, the geometry processor (e.g., geometry processor 244 of FIG. 2) may fetch the vertices and the indices from the geometry cache or the geometry pool depending on the implementation. Next, as part of sub-task E of task 506, the meshlet may be processed further. As an example, the meshlet vertices and primitives may be processed by rasterizer fragment processor 246 of FIG. 2 in order to create fragments from the primitives. Each fragment may correspond to a pixel on the screen. The fragments may also be shaded to compute color. Although FIG. 7 describes the steps in a certain order, they need not be performed in this order.

In conclusion, the present disclosure relates to a graphics processing system comprising a processor configured to retrieve a first level of detail value for a meshlet instance. The processor may further be configured to compute a second level of detail value for the meshlet instance. The processor may further be configured to, based on a comparison between the first level of detail value for the meshlet instance and the second level of detail value for the meshlet instance, select a final level of detail value for the meshlet instance. The processor may further be configured to fetch vertices and corresponding indices for the meshlet instance based on the final level of detail value for the meshlet instance and process the vertices of the meshlet instance.

The processor may further be configured to retrieve the first level of detail value for the meshlet instance from a level of detail residency map, where the level of detail residency map corresponds to levels of detail for the meshlet instance, and where the level of detail residency map is maintained by a central processing unit (CPU) associated with the graphics processing system. The processor may further be configured to compute the second level of detail value for the meshlet instance by performing transformation and bounding box operations with respect to the meshlet instance. The final level of detail value for the meshlet instance may be selected as a maximum of the first level of detail value for the meshlet instance and the second level of detail value for the meshlet instance, where a higher level of detail value corresponds to a coarser representation.

The processor may further be configured to update a level of detail recording map, where a higher level of detail value corresponds to a coarser representation, with an updated level of detail value for the meshlet instance, where the updated level of detail value meshlet instance is selected as a minimum of the second level of detail value for the meshlet instance and a third level of detail value for the meshlet instance as per a current recording map accessible to the processor. As part of the graphics processing system, an updated level of detail recording map is provided to a central processing unit (CPU) associated with the graphics processing system. The CPU may be configured to process the updated level of detail recording map to determine meshlet vertices to be added or discarded from a geometry pool maintained by the CPU.

In another example, the present disclosure relates to a method for processing geometry for a frame. The method may include for each meshlet instance associated with the frame, a processor performing transformation and bounding box processing operations to determine if a meshlet instance is visible on a projected screen. The method may further include for each visible meshlet instance associated with the frame, retrieving a first level of detail value. The method may further include for each visible meshlet instance associated with the frame, computing a second level of detail value.

The method may further include for each visible meshlet instance associated with the frame, based on a comparison between the first level of detail value for the visible meshlet instance and the second level of detail value for the visible meshlet instance, selecting a final level of detail value for the visible meshlet instance. The method may further include fetching vertices and corresponding indices for each visible meshlet instance based on a final level of detail value for each visible meshlet instance associated with the frame and processing respective vertices.

The method may further include for each visible meshlet instance associated with the frame, retrieving the first level of detail value for the visible meshlet instance from a level of detail residency map, where the level of detail residency map corresponds to levels of detail for the meshlet instance, and where the level of detail residency map is maintained by a central processing unit (CPU) associated with the graphics processing system. The final level of detail value for each visible meshlet instance may be selected as a maximum of the first level of detail value for the visible meshlet instance and the second level of detail value for the visible meshlet instance, where a higher level of detail value corresponds to a coarser representation The method may further include updating a level of detail recording map, where a higher level of detail value corresponds to a coarser representation, with an updated level of detail value for each visible meshlet instance, and where the updated level of detail value for each visible meshlet instance is selected as a minimum of the second level of detail value for the visible meshlet instance and a current level of detail value for the visible meshlet instance as per a level of detail residency map accessible to the processor. The method may further include providing an updated level of detail recording map to a central processing unit (CPU) associated with the graphics processing system.

The CPU may be configured to process the updated level of detail recording map to determine meshlet vertices to be added or discarded from a geometry pool maintained by the CPU. The method may further include transforming, shading, and outputting pixel values based on processing of the respective vertices by the processor.

In another example, the present disclosure relates a graphics processing system comprising a processor configured to, for each meshlet instance associated with a frame, perform transformation and bounding box processing operations to determine if a meshlet instance is visible on a projected screen. The processor may further be configured to, for each visible meshlet instance associated with the frame, retrieve a first level of detail value. The processor may further be configured to, for each visible meshlet instance associated with the frame, compute a second level of detail value.

The processor may further be configured to, for each visible meshlet instance associated with the frame, based on a comparison between the first level of detail value for the visible meshlet instance and the second level of detail value for the visible meshlet instance, select a final level of detail value for the visible meshlet instance. The processor may further be configured to fetch vertices and corresponding indices for each visible meshlet instance based on a final level of detail value for each visible meshlet instance associated with the frame and process respective vertices based on the final level of detail value for each visible meshlet instance associated with the frame.

The processor may further be configured to, for each visible meshlet instance associated with the frame, retrieve the first level of detail value for the visible meshlet instance from a level of detail residency map, where the level of detail residency map corresponds to levels of detail for the meshlet instance, and where the level of detail residency map is maintained by a central processing unit (CPU) associated with the graphics processing system. The final level of detail value for each visible meshlet instance may be selected as a maximum of the first level of detail value for the visible meshlet instance and the second level of detail value for the visible meshlet instance, where a higher level of detail value corresponds to a coarser representation.

The processor may further be configured to update a level of detail recording map, where a higher level of detail value corresponds to a coarser representation, with an updated level of detail value for each visible meshlet instance, and where the updated level of detail value for each visible meshlet instance is selected as a minimum of the second level of detail value for the visible meshlet instance and a current level of detail value for the visible meshlet instance as per a level of detail residency map accessible to the processor. The updated level of detail recording map may be provided to a central processing unit (CPU) associated with the graphics processing system. The CPU may be configured to process the updated level of detail recording map to determine meshlet vertices to be added or discarded from a geometry pool maintained by the CPU.

It is to be understood that the methods, modules, and components depicted herein are merely exemplary. Alternatively, or in addition, the functionality described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or inter-medial components. Likewise, any two components so associated can also be viewed as being "operably connected," or "coupled," to each other to achieve the desired functionality. Merely because a component, which may be an apparatus, a structure, a system, or any other implementation of a functionality, is described herein as being coupled to another component does not mean that the components are necessarily separate components. As an example, a component A described as being coupled to another component B may be a sub-component of the component B, the component B may be a sub-component of the component A, or components A and B may be a combined sub-component of another component C.

The functionality associated with some examples described in this disclosure can also include instructions stored in a non-transitory media. The term "non-transitory media" as used herein refers to any media storing data and/or instructions that cause a machine to operate in a specific manner. Exemplary non-transitory media include non-volatile media and/or volatile media. Non-volatile media include, for example, a hard disk, a solid-state drive, a magnetic disk or tape, an optical disk or tape, a flash memory, an EPROM, NVRAM, PRAM, or other such media, or networked versions of such media. Volatile media include, for example, dynamic memory such as DRAM, SRAM, a cache, or other such media. Non-transitory media is distinct from, but can be used in conjunction with transmission media. Transmission media is used for transferring data and/or instruction to or from a machine. Exemplary transmission media include coaxial cables, fiber-optic cables, copper wires, and wireless media, such as radio waves.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to a specific example are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed:

1. A graphics processing system comprising a processor configured to:
   retrieve a first level of detail value, for a meshlet instance, from a level of detail residency map comprising levels of detail for the meshlet instance;
   by performing transformation and bounding box processing operations with respect to the meshlet instance, compute a second level of detail value for the meshlet instance;
   provide an updated level of detail recording map to a central processing unit (CPU) associated with the graphics processing system, wherein the CPU is configured to process the updated level of detail recording map to determine meshlet vertices to be added or discarded from a geometry pool maintained by the CPU;
   based on a comparison between the first level of detail value for the meshlet instance and the second level of detail value for the meshlet instance, select a final level of detail value for the meshlet instance; and
   fetch vertices and corresponding indices, for the meshlet instance based on the final level of detail value for the meshlet instance, from a geometry cache for the processor or from the geometry pool maintained by the CPU, and process the vertices of the meshlet instance.

2. The graphics processing system of claim 1, wherein the processor is configured to retrieve the first level of detail value for the meshlet instance from the level of detail residency map, wherein the level of detail residency map is maintained by the (CPU).

3. The graphics processing system of claim 1, wherein the final level of detail value for the meshlet instance is selected as a maximum of the first level of detail value for the meshlet instance and the second level of detail value for the meshlet instance, wherein a higher level of detail value corresponds to a coarser representation.

4. The graphics processing system of claim 1, wherein the processor is further configured to update the level of detail recording map with an updated level of detail value for the meshlet instance.

5. The graphics processing system of claim 4, wherein the updated level of detail value meshlet instance is selected as a minimum of the second level of detail value for the meshlet instance and a third level of detail value for the meshlet instance as per a current recording map accessible to the processor.

6. The graphics processing system of claim 1, wherein the processor is further configured to transform, shade, and output pixel values based on processing of the respective vertices by the processor.

7. A method for processing geometry for a frame, the method comprising:
   for each meshlet instance associated with the frame, a processor performing transformation and bounding box processing operations to determine if a meshlet instance is visible on a projected screen;
   for each visible meshlet instance associated with the frame, retrieving a first level of detail value from a level of detail residency map comprising levels of detail for the meshlet instance;
   for each visible meshlet instance associated with the frame, computing a second level of detail value;
   for each visible meshlet instance associated with the frame, providing an updated level of detail recording map to a central processing unit (CPU) associated with the graphics processing system, wherein the CPU is configured to process the updated level of detail recording map to determine meshlet vertices to be added or discarded from a geometry pool maintained by the CPU;
   for each visible meshlet instance associated with the frame, based on a comparison between the first level of detail value for the visible meshlet instance and the second level of detail value for the visible meshlet instance, selecting a final level of detail value for the visible meshlet instance; and
   fetching vertices and corresponding indices for each visible meshlet instance based on a final level of detail value for each visible meshlet instance associated with the frame, from a geometry cache for the processor or from the geometry pool maintained by the CPU, and processing respective vertices.

8. The method of claim 7, further comprising, for each visible meshlet instance associated with the frame, retrieving the first level of detail value for the visible meshlet instance from the level of detail residency map, wherein the level of detail residency map is maintained by the CPU.

9. The method of claim 7, wherein the final level of detail value for each visible meshlet instance is selected as a maximum of the first level of detail value for the visible meshlet instance and the second level of detail value for the visible meshlet instance, and wherein a higher level of detail value corresponds to a coarser representation.

10. The method of claim 7, further comprising updating a level of detail recording map with an updated level of detail value for each visible meshlet instance.

11. The method of claim 7, further comprising transforming, shading, and outputting pixel values based on processing of the respective vertices by the processor.

12. The method of claim 7, wherein the updated level of detail value for each visible meshlet instance is selected as a minimum of the second level of detail value for the visible meshlet instance and a current level of detail value for the visible meshlet instance as per a level of detail residency map accessible to the processor.

13. A graphics processing system comprising a processor configured to:
   for each meshlet instance associated with a frame, perform transformation and bounding box processing operations to determine if a meshlet instance is visible on a projected screen;
   for each visible meshlet instance associated with the frame, retrieve a first level of detail value from a level of detail residency map comprising levels of detail for the meshlet instance;
   for each visible meshlet instance associated with the frame, compute a second level of detail value;
   for each visible meshlet instance associated with the frame, provide an updated level of detail recording map to a central processing unit (CPU) associated with the graphics processing system, wherein the CPU is configured to process the updated level of detail recording map to determine meshlet vertices to be added or discarded from a geometry pool maintained by the CPU;

for each visible meshlet instance associated with the frame, based on a comparison between the first level of detail value for the visible meshlet instance and the second level of detail value for the visible meshlet instance, select a final level of detail value for the visible meshlet instance; and fetch vertices and corresponding indices for each visible meshlet instance based on a final level of detail value for each visible meshlet instance associated with the frame, from a geometry cache for the processor or from the geometry pool maintained by the CPU, and process respective vertices based on the final level of detail value for each visible meshlet instance associated with the frame.

14. The graphics processing system of claim 13, wherein the processor is configured to, for each visible meshlet instance associated with the frame, retrieve the first level of detail value for the visible meshlet instance from the level of detail residency map, wherein the level of detail residency map is maintained by the CPU.

15. The graphics processing system of claim 13, wherein the final level of detail value for each visible meshlet instance is selected as a maximum of the first level of detail value for the visible meshlet instance and the second level of detail value for the visible meshlet instance, and wherein a higher level of detail value corresponds to a coarser representation.

16. The graphics processing system of claim 13, wherein the processor is further configured to update a level of detail recording map with an updated level of detail value for each visible meshlet instance.

17. The graphics processing system of claim 13, wherein the updated level of detail value for each visible meshlet instance is selected as a minimum of the second level of detail value for the visible meshlet instance and a current level of detail value for the visible meshlet instance as per a level of detail residency map accessible to the processor.

18. The graphics processing system of claim 13, wherein the processor is further configured to transform, shade, and output pixel values based on processing of the respective vertices by the processor.

* * * * *